United States Patent

Fugman

Patent Number: 5,651,484
Date of Patent: Jul. 29, 1997

[54] LADDER SUPPORT ACCESSORY FOR TRUCK RACK

[76] Inventor: Lowell S. Fugman, 190 Assisiknoll Ct., Cincinnati, Ohio 45238

[21] Appl. No.: 514,275

[22] Filed: Aug. 11, 1995

[51] Int. Cl.$^6$ ............................................. B60R 9/042
[52] U.S. Cl. ........................ 224/405; 224/310; 224/552; 224/553; 224/568; 414/462; 403/58; 182/127; 280/4
[58] Field of Search ........................... 224/401, 402, 224/403, 405, 310, 545, 546, 547, 548, 553, 555, 564, 568, 550, 551, 552; 182/127; 211/182, 195; 403/53, 57, 58; 296/3; 414/462; 280/4

[56] References Cited

U.S. PATENT DOCUMENTS

| | | | |
|---|---|---|---|
| 2,746,628 | 5/1956 | Neyra | 182/127 |
| 2,946,397 | 7/1960 | Berberich | 182/127 |
| 3,013,681 | 12/1961 | Garenett | 280/4 |
| 3,963,136 | 6/1976 | Spanke . | |
| 4,413,801 | 11/1983 | Lancaster et al. | 224/536 |
| 4,826,387 | 5/1989 | Audet | 414/462 |
| 4,844,490 | 7/1989 | Kohler | 280/4 |
| 5,058,791 | 10/1991 | Henriquez et al. . | |
| 5,255,951 | 10/1993 | Moore, III . | |
| 5,360,151 | 11/1994 | Fine . | |
| 5,398,778 | 3/1995 | Sexton . | |

FOREIGN PATENT DOCUMENTS

| | | | |
|---|---|---|---|
| 461709 | 12/1991 | European Pat. Off. | 224/310 |
| 3220417 | 8/1983 | Germany . | |
| 3335173 | 4/1985 | Germany . | |
| 8302755 | 8/1983 | WIPO | 224/310 |

*Primary Examiner*—Henry J. Recla
*Assistant Examiner*—Gregory M. Vidovich
*Attorney, Agent, or Firm*—Wood, Herron & Evans, LLP

[57] ABSTRACT

A ladder support accessory is disclosed for pivotally supporting a ladder on a truck rack. The ladder support accessory includes, in one embodiment, a pair of joints mounted to a side rail of the truck rack and a pair of ladder support members pivotably connected to the joints. The ladder support members extend inboard of and substantially transverse to the side rail and are pivotable in a substantially vertical plane between substantially horizontal and vertical positions. A ladder is secured to the ladder support members and is at least partially supported by front and rear rails of the truck rack when the ladder support members are in the horizontal position. The ladder is supported solely by the ladder support members when the ladder support members are pivoted to the vertical position. The ladder support members are also pivotable in a substantially horizontal plane between a "use" position, with the ladder support members extending parallel to the front and rear rails, and a "stow" position, with the ladder support members extending inboard of and parallel to the side rail.

24 Claims, 5 Drawing Sheets

LADDER SUPPORT ACCESSORY FOR TRUCK RACK

FIELD OF THE INVENTION

The present invention relates generally to vehicle racks and, more particularly, to truck racks for supporting ladders and other elongated items on the rack.

BACKGROUND OF THE INVENTION

Truck racks are widely used in the industry for carrying ladders and other elongated items such as PVC pipes and lumber, for example, between work sites. Typically, these racks am mounted above a bed of a pick-up truck and include front, rear and side rails disposed in a generally horizontal position above the truck bed. In known truck rack systems, a ladder is supported on the front and rear rails of the rack, with the ladder being secured to the front and rear rails by elastic cords or other well known means. In this way, the ladder can be safely transported between job sites without compromising the carrying space provided in the bed of the truck.

However, while the truck rack may not compromise the carrying space in the truck bed, it will be appreciated that the location of the ladder on the truck rack can impair access to articles located beneath the ladder. To gain access to these articles, it is common practice to first unsecure the ladder from the front and rear rails of the truck rack and then lift and remove the ladder from the rack before access to the articles can be achieved. Before leaving the site, the ladder must then be lifted and resecured to the truck rack front and rear rails. It will be appreciated that in those instances when the ladder is not being used at the site, the additional lifting of the ladder required to gain access to the truck bed is potentially hazardous to the lifter and others in close proximity, and, in any event, is an undesirable nuisance.

Accordingly, a primary object of the present invention is to provide a ladder support accessory which allows convenient access to the bed of a truck, free of obstruction from a ladder, without unsecuring the ladder from the rack.

Another object of the present invention is to provide such a ladder support accessory which can be sold in kit form to retrofit existing truck racks and is readily installable by the purchaser.

Yet another object of the present invention is to provide such a ladder support accessory which is readily adaptable to truck racks of varying configurations.

SUMMARY OF THE INVENTION

To these ends, a ladder support accessory is disclosed for pivotally supporting a ladder on a truck rack having front, rear and at least one side rail. The ladder support accessory includes at least one rotary joint having a stationary element welded or otherwise joined to the side rail and a moveable element rotatably supported by the stationary element and movable relative thereto about a generally horizontal axis substantially parallel to the longitudinal axis of the truck rack side rail.

The ladder support accessory includes at least one ladder support member having an inner end connected to the movable element of the joint and pivotable therewith about the horizontal axis. The ladder support member includes a ladder engaging section pivotable with the inner end of the ladder support member in a generally vertical plane disposed generally transverse to the truck rack side rail. The ladder engaging section is pivotable between a first position in which the ladder engaging section is in a generally horizontal position disposed transverse to and inboard of the truck rack side rail and a second position in which the ladder engaging section is in a generally vertical position.

In accordance with the invention, a ladder is secured to the ladder engaging section of the ladder support member and is supported at least partially on the front and rear rails when the ladder support member is pivoted to the first horizontal transverse position inboard of the truck rack side rail. The ladder is supported solely by the ladder support member when the ladder support member is pivoted to the second vertical position thereby providing convenient access to the truck bed free of obstruction by the ladder.

In a preferred embodiment of the invention, the ladder support member incorporates a pivotable joint located between the inner end and the ladder engaging section. In this way, the ladder engaging section is further pivotable about the pivotable joint in a substantially horizontal plane between "use" and "stow" positions, with the ladder support member extending substantially parallel to the front and rear rails when the ladder support member is in the "use" position and extending inboard of and substantially parallel to the side rail when the ladder support member is in the "stow" position.

Preferably, at least one latching member is mounted on the side rail and is releasably engageable with the ladder support member in the "stow" position to releasably maintain the ladder support member in the "stow" position inboard of and generally parallel to the side rail. Additionally, the ladder support member includes at least one ladder support element mounted thereto adjacent the inner end of the ladder support member and disposed generally in the vertical plane to engage the longitudinal edge of a ladder located on the ladder engaging section when the ladder support member is pivoted to the second generally vertical position. In one embodiment, the ladder support element is adjustably mounted to the ladder support member at selectively different positions adjacent the inner end of the ladder support member to accommodate truck racks of varying configurations.

The ladder support member includes a rotation limiter fixedly connected to or integral with either the ladder support member or the moveable element and engageable with the side rail when the ladder support member is pivoted in the second position to limit movement of the ladder support member beyond the substantially vertical position. The ladder support member further includes a rotation limiter fixedly connected to or integral with the moveable element and engageable with the side rail when the ladder support member is pivoted in the first position to limit movement of the ladder support member beyond the substantially horizontal position.

Accordingly, the inventor provides a ladder rack accessory which allows convenient access to the bed of a truck, free of obstruction from a ladder, without unsecuring the ladder from the rack. At the same time, the invention provides a ladder support accessory which can be sold in kit form to retrofit existing truck racks and is readily installable by the purchaser. Moreover, the present invention provides a ladder support accessory which is readily adaptable to truck racks of varying configurations.

BRIEF DESCRIPTION OF THE DRAWINGS

The accompanying drawings, which are incorporated in and constitute a part of this specification, illustrate an embodiment of the invention and, together with the general description of the invention given above and the detailed description of an embodiment given below, serve to explain the principles of the present invention.

DETAILED DESCRIPTION OF THE INVENTION

Figure 1:
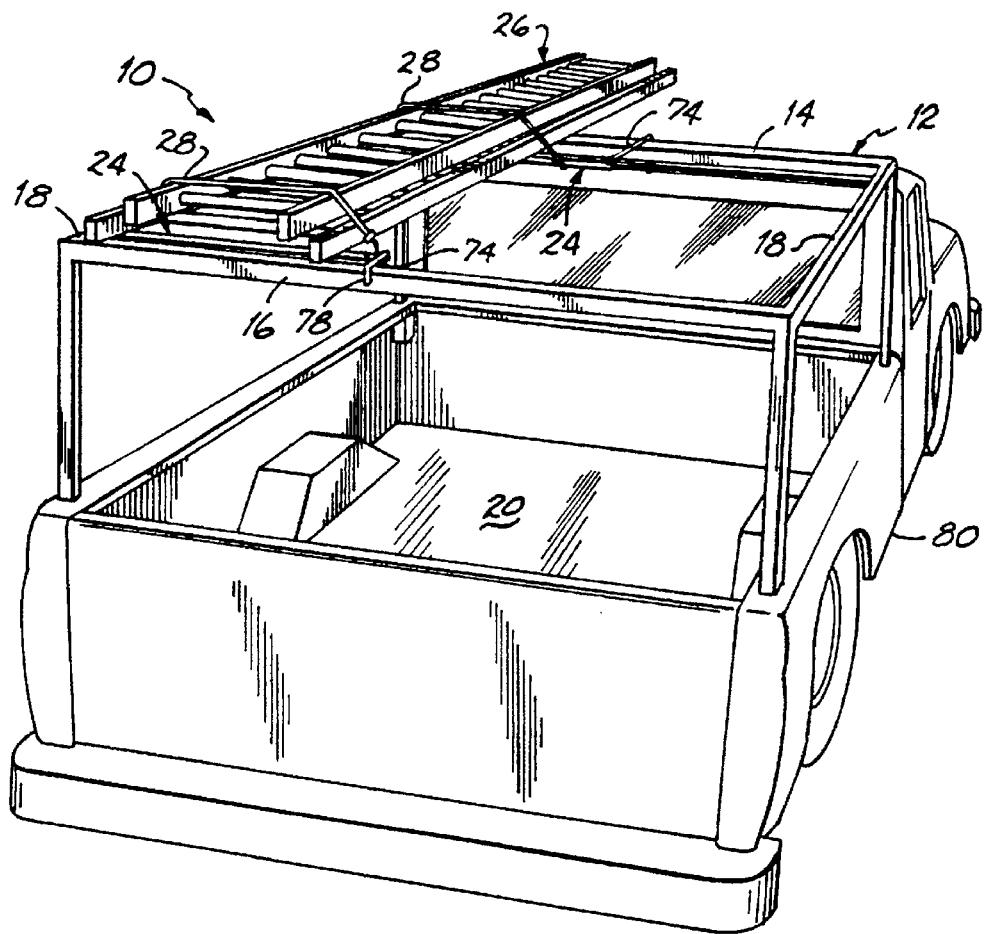
FIG. 1 is a perspective view of a ladder support accessory mounted to a truck rack in accordance with the general principles of the present invention.

Referring now in detail to the drawings, a ladder support accessory 10 in accordance with the principles of the present invention is shown in FIG. 1. Ladder support accessory 10 is designed to be readily mountable on conventional truck racks found on pick-up trucks, for example, such as truck rack 12 of FIG. 1. Truck rack 12 includes a front rail 14, a parallel rear rail 16, and a pair of perpendicular side rails 18 disposed generally horizontally above a truck bed 20. In a preferred embodiment of the invention as shown in the figures, the ladder support accessory 10 includes a pair of joints 22 mounted to one of the side rails 18 and a pair of ladder support members 24 pivotally connected to the joints. A ladder 26 is secured to the ladder support members 24 through elastic cords 28 or other well known means whereby the ladder support members and the associated ladder are pivotable between substantially horizontal and vertical positions as shown in FIGS. 1 and 2, respectively.

Figure 2:
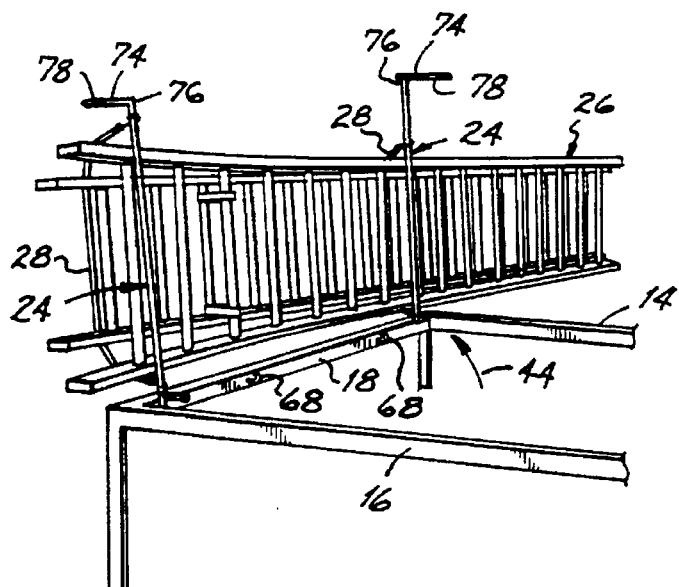
FIG. 2 is a partial perspective view similar to FIG. 1 showing a pair of ladder support members pivoted to a substantially vertical position with a ladder secured to the ladder support members.

In accordance with the present invention as shown in FIGS. 1 and 2, the ladder 26 is supported at least partially by the front and rear rails 14 and 16, respectively, when the ladder support members 24 are pivoted to the horizontal position (see FIG. 1), and solely by the ladder support members 24 when the ladder support members are pivoted to the vertical position (see FIG. 2). In this way, it will be appreciated that the ladder support accessory 10 thus provides convenient access to the truck bed 20, free of obstruction by the ladder 26, as the ladder support members 24 are pivoted from the horizontal position shown in FIG. 1 to the vertical position shown in FIG. 2. As such, the ladder 26 does not need to be unsecured from the truck rack 12 to gain access to the truck bed 20 as is required in known truck rack systems.

Figure 3:
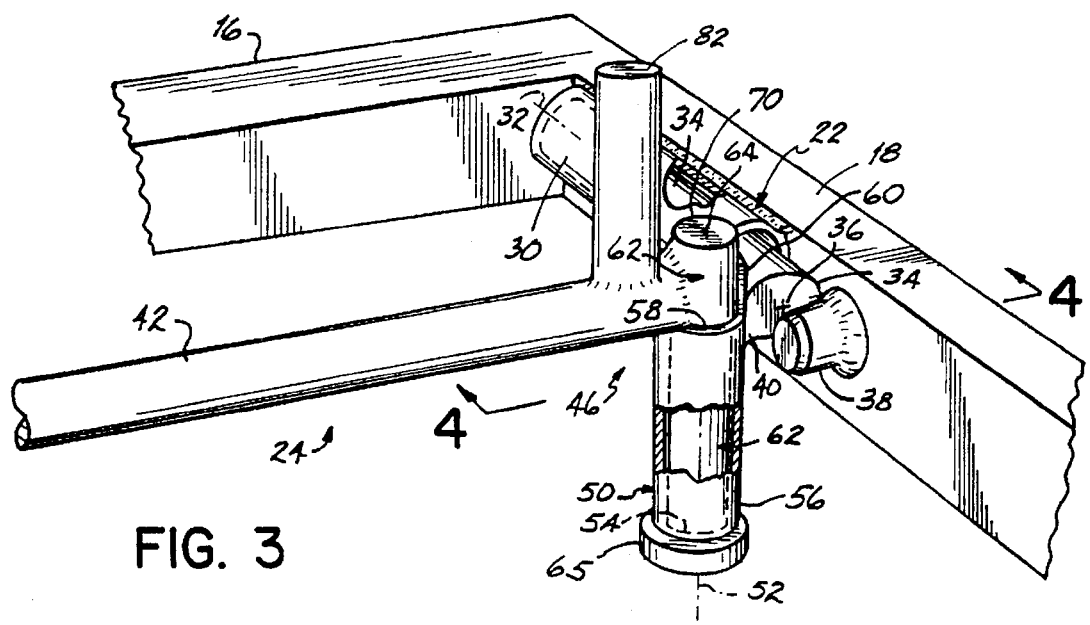
FIG. 3 is a partial perspective view of the ladder support accessory of FIG. 1 showing one of the ladder support members pivoted to a substantially horizontal "use" position.

With reference to FIG. 3, one of the ladder support members 24 of the ladder support accessory 10 is shown pivotally mounted to a side rail 18 of the truck rack 12 through a joint 22. Preferably, the joint 22 includes a stationary element or tubular sleeve 30, made of ¾" steel pipe for example, welded or otherwise joined to the side rail 18. The tubular sleeve 30 is mounted to have an axis 32 substantially parallel to the longitudinal axis of the side rail 18. Joint 22 further includes a movable element or leg 34, made of ¾" round steel bar for example, inserted into the tubular sleeve 30 and having an axis of rotation 36 substantially coextensive with the axis 32 of the tubular sleeve 30. The leg 34 is thus freely rotatable in the tubular sleeve 30 about the axis of rotation 36 for purposes to be described in more detail below. A stop 38 is welded or otherwise joined to the side rail 18 to prevent leg 34 from sliding out of the tubular sleeve 30.

In one embodiment, the tubular sleeve 30 and stop 38 are mounted to a steel plate (not shown) which is then welded or otherwise joined to the side rail 18, shown as rectangular tubing in the figures. In those instances where the side rails 18 are 1¼"–1½" circular pipe (not shown) rather than rectangular tubing, a "C-shaped" channel member (not shown) is provided, and welded or otherwise joined to the side rail pipe. The steel plate described above is then welded or otherwise joined to the "C-shaped" channel member. In this way, the joints 22 and ladder support members 24 are easily joined to a truck rack 12 having either rectangular tubing side rails 18 as shown in the figures or pipe side rails (not shown).

With further reference to FIG. 3, each of the ladder support members 24 has an inner end 40 welded or otherwise joined to the leg 34 of the joint 22 and a ladder engaging section 42, made of ¾" round steel bar for example, for securing the ladder 26 in accordance with the invention. Each ladder engaging section 42 is pivotable with the inner end in a substantially vertical plane generally perpendicular to the side rail 18, as shown by arrow 44 in FIGS. 2 and 6. In this way, the ladder engaging sections 42 are pivotable between the substantially horizontal position shown in FIG. 1 and the vertical position shown in FIG. 2 as leg 34 rotates in tubular sleeve 30 about the axis of rotation 36.

Figure 7:
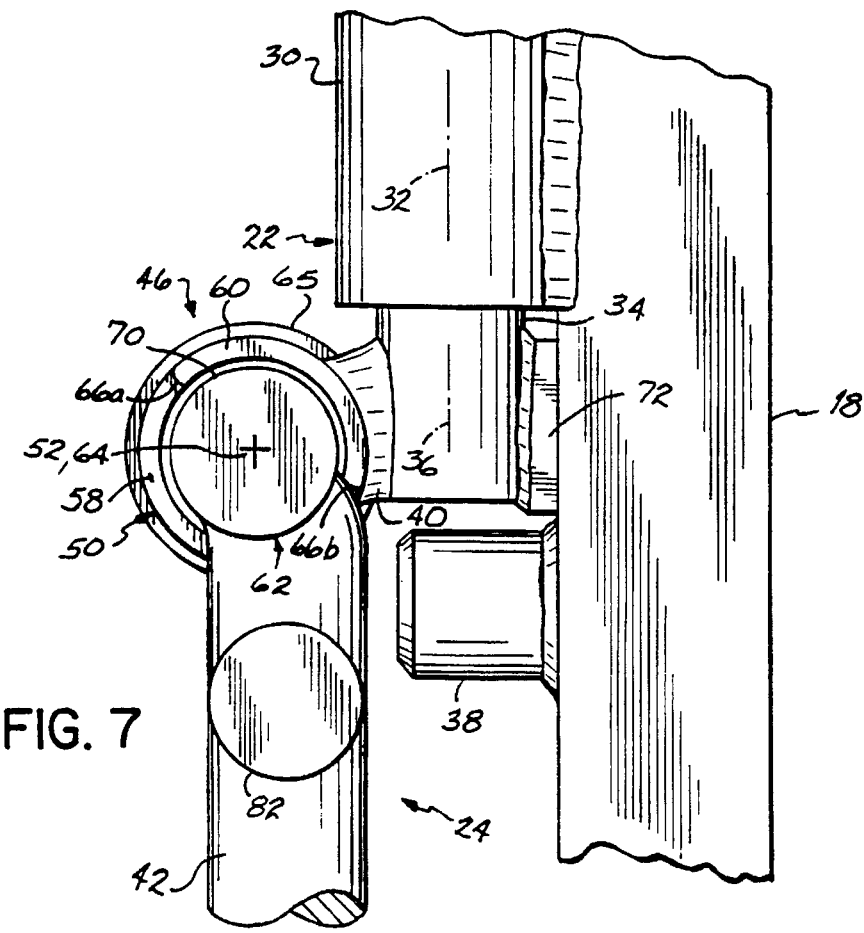
FIG. 7 is a view similar to FIG. 5 showing the ladder support member pivoted to a substantially horizontal "stow" position.
Figure 8:
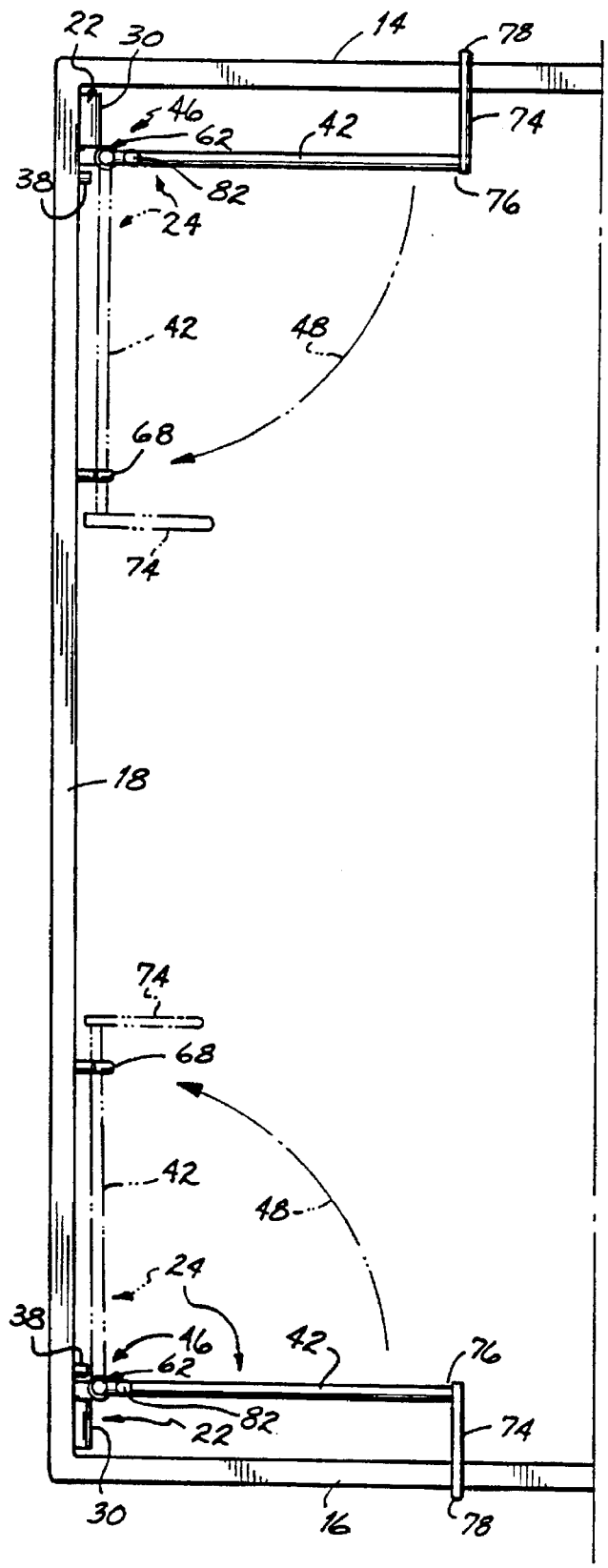
FIG. 8 is a diagrammatic partial top plan view showing a pair of ladder support members pivoting in a substantially horizontal plane between the "use" and "stow" positions.

Referring to FIGS. 3–8, each ladder support member 24 preferably includes a joint 46 located between the inner end 40 and the ladder engaging section 42 of the ladder support member for pivotally connecting the ladder engaging section in a substantially horizontal plane to the joint 22, as shown most clearly by arrows 48 in FIG. 8. In particular, the joint 46 includes a tubular sleeve 50 welded or otherwise joined to the leg 34 of the joint 22 which pivots about the same axis of rotation 36 as the ladder engaging section 42 as described above.

With further reference to FIGS. 3–8, the tubular sleeve 50 has an axis 52 which is perpendicular to, and offset from, the axes 32 and 36 of the tubular sleeve 30 and leg 34, respectively, of the joint 22. The tubular sleeve 50, also made of ¾" steel pipe for example, includes an opening 54 at one end 56 of the tubular sleeve and a notch 58 formed at the other end 60. Each ladder support member 24 includes a leg 62, made of ¾" round steel bar for example, inserted into the tubular sleeve 50 and having an axis of rotation 64 substantially coextensive with the axis 52 of the tubular sleeve 50. The leg 62 includes an end cap or head 65 welded or otherwise joined to the leg to prevent the leg from sliding out of the tubular sleeve 50 when the ladder support members 24 are pivoted between horizontal and vertical positions. In this way, it will be appreciated that the ladder support members 24 are pivotable in a substantially vertical plane (see FIGS. 2 and 6) as the ladder support members pivot through joint 22 and are further pivotable in a substantially horizontal plane (see FIGS. 5, 7 and 8) as the ladder support members pivot through joint 46 as will be described in more detail below.

Figure 5:
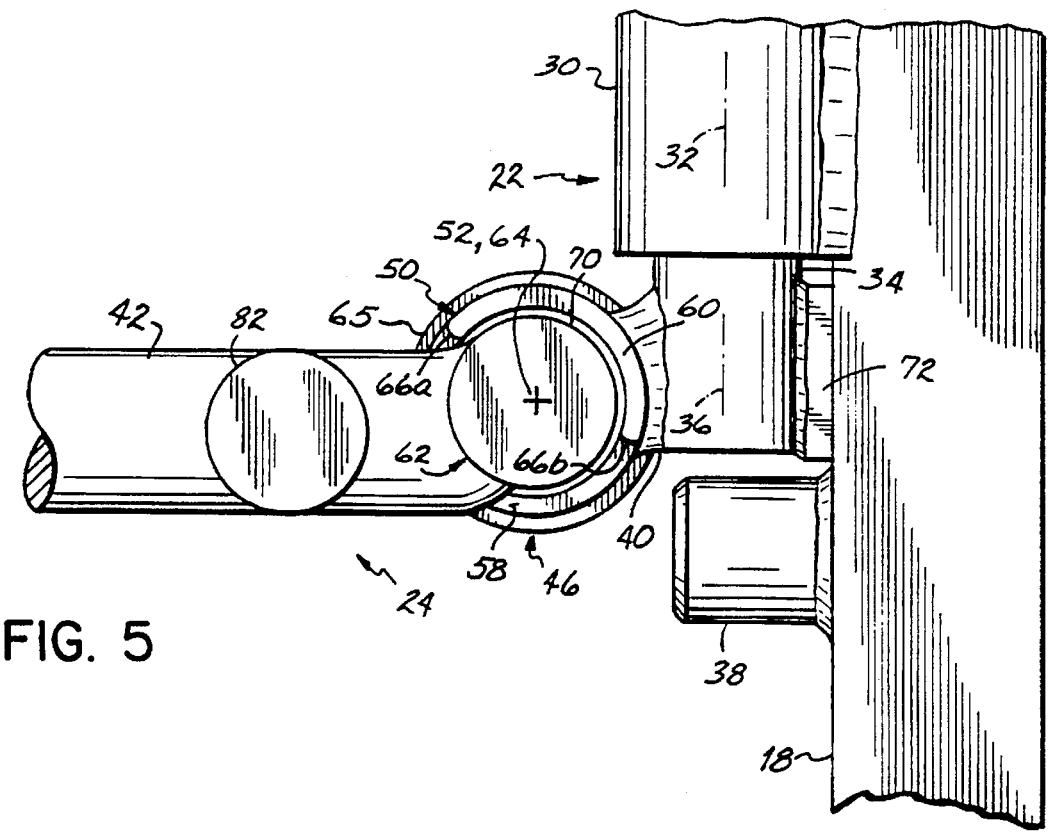
FIG. 5 is a partial top plan view of the ladder support accessory of the present invention showing one of the ladder support members pivoted to a substantially horizontal "use" position.

As shown most clearly in FIGS. 5, 7 and 8, the ladder support members 24 are pivotable through joints 22 between a "use" position, as shown in FIG. 5 and by the solid lines in FIG. 8, and a "stow" position as ladder support members 24 extend in a substantially horizontal position parallel to the front and rear rails 14 and 16, respectively, and inboard of the side rails 18. In the "stow" position, the ladder support members 24 extend inboard of and substantially parallel to the side rail 18.

As shown most clearly in FIGS. 5 and 7, the notch 58 of the tubular sleeve 50 has rotation limiters 66a and 66b to limit rotation of the ladder support members 24 about the axis of rotation 64 between the "use" and "stow" positions described above. More particularly, in the "use" position shown in FIG. 5, each ladder support member 24 is limited from rotating beyond a position substantially transverse to the side rail 18 by the rotation limiter 66a. In the "stow" position, the ladder support member 24 is limited from rotating beyond a position substantially parallel to the side rail 18 by the rotation limiter 66b. In one embodiment, as shown most clearly in FIG. 8, a pair of hooks 68 are mounted on the side rail 18 to releasably engage the ladder support members 24 in the "stow" position. In this way, the hooks 68 releasably maintain the ladder support members 24 inboard of and generally parallel to the side rail 18 in the "stow" position. It will be appreciated by those skilled in the art that other mechanical latching devices are possible to replace the hooks 68 shown and described herein.

In one embodiment, each leg 62 is spring-biased downwardly in the tubular sleeve 50 (not shown) and each ladder support member 24 has a reduced diameter portion (not shown) adjacent leg 62. Notch 58 includes an upwardly directed and rounded camming surface (not shown) disposed intermediate the rotation limiters 66a and 66b to divide the notch into two sections, i.e., "use" and "stow" sections. For example, as the ladder support member 24 is pivoted from the "use" position to the "stow" position, the reduced diameter portion of the ladder support member rides up and over the intermediately disposed camming surface and fails into the "stow" section of the notch. The camming surface prevents the ladder support member 24 from travelling to the "use" section of the notch until a sufficient force is applied to cam the reduced diameter portion of the ladder support member up and over the camming surface and into the "use" section of the notch 58. It will be appreciated that in this embodiment, the hooks 68 mounted to the side rail 18 can be dispensed with.

Figure 4:
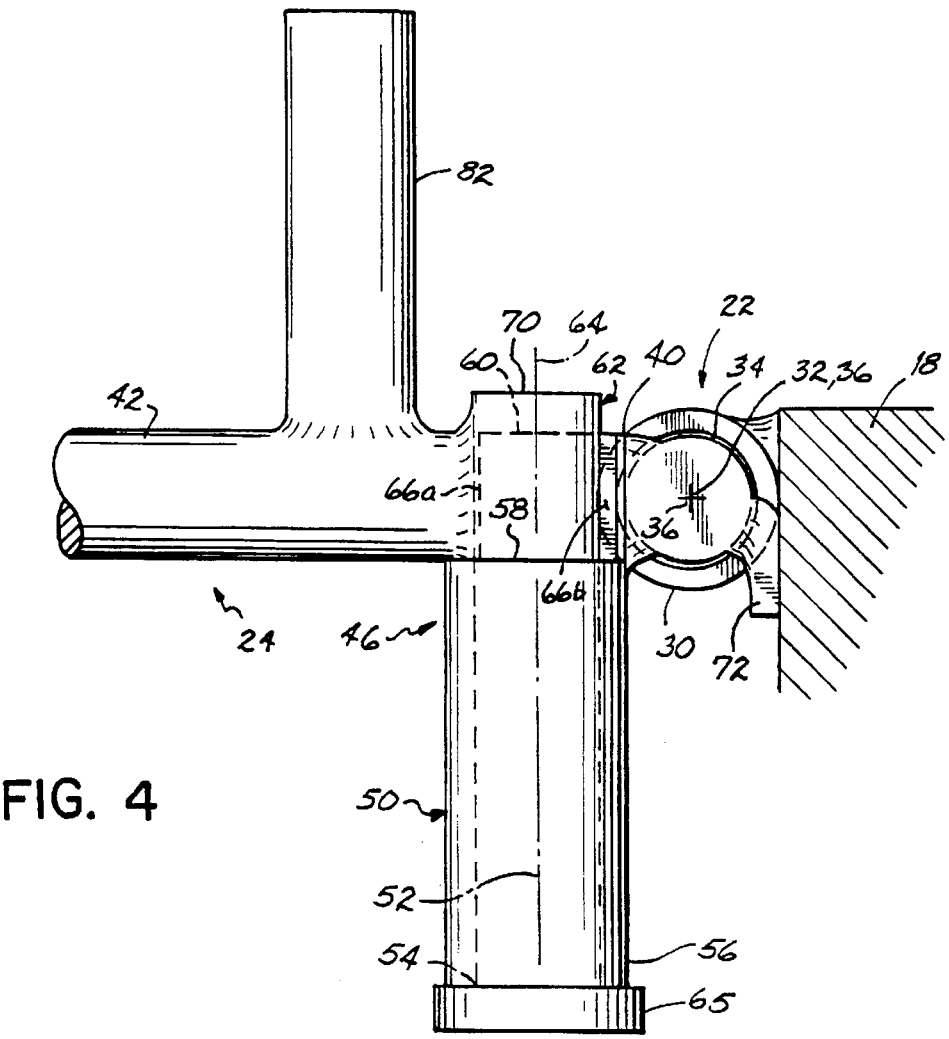
FIG. 4 is a cross-sectional view of the ladder support accessory of FIG. 3 taken generally along lines 4—4 of FIG. 3.
Figure 6:
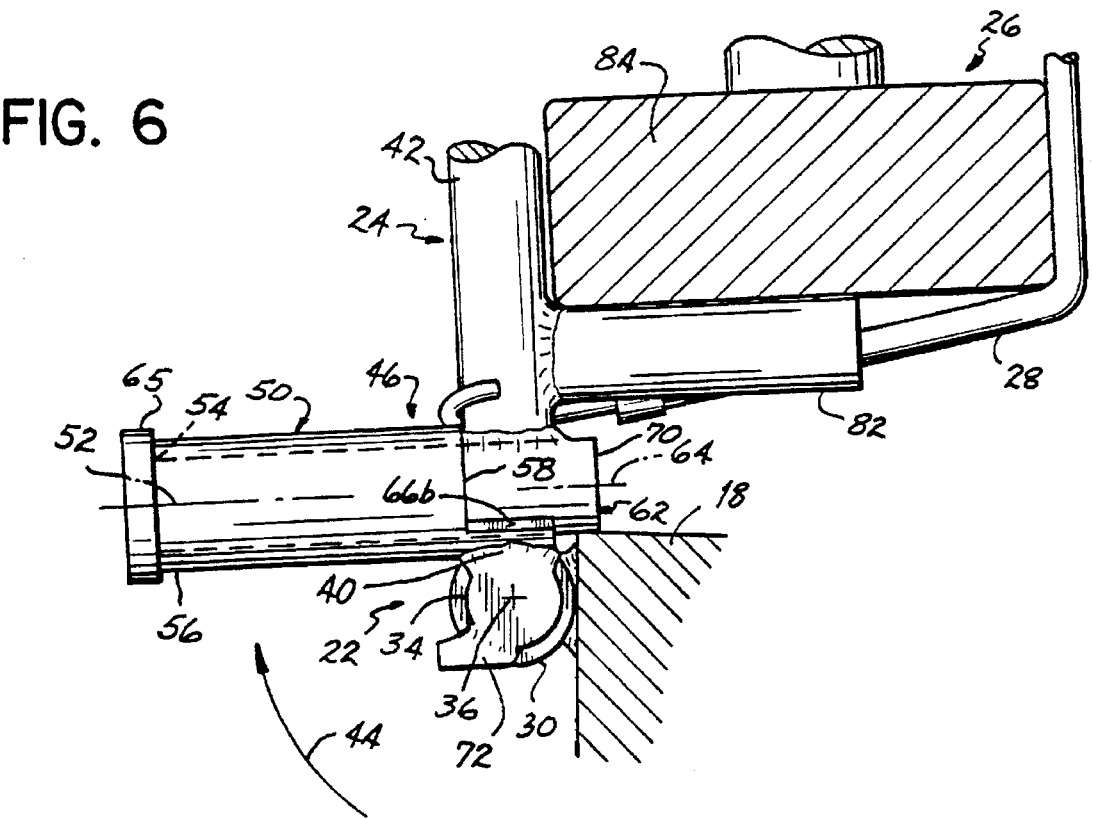
FIG. 6 is a partial side view showing a ladder support member pivoted to a substantially vertical position with a ladder secured to the ladder support member.

Referring to FIGS. 4 and 6, each ladder support member 24 preferably includes a rotational limiter 70 connected to or integral with the leg 62 to limit rotation of the ladder support member about the axis of rotation 36 beyond the substantially vertical position shown in FIG. 6. In the vertical position, the rotation limiter 70 engages with the side rail 18 to limit further rotation of the ladder support member 24 about the axis 36. It will be appreciated that the rotation limiter 70 could be dispensed with, and a rotation limiter could be connected to or integral with the leg 34 (not shown) without departing from the spirit of the invention. In another embodiment, a chain (not shown) could be connected between the front and rear rails 14 and 16, respectively, and the respective ladder support members 24 to limit rotation thereof beyond a desired position.

With further reference to FIGS. 4 and 6, each leg 34 preferably includes a rotation limiter 72, made of a ⅛"×1"× ¾" steel plate for example, welded or otherwise joined to the leg adjacent the side rail 18 at a point below the axis of rotation 36. The rotation limiters 72 limit rotation of the ladder support members 24 about the axis of rotation 36 beyond the substantially horizontal position shown in FIG. 4. In this horizontal position, the rotation limiter 72 engages with the side rail 18 to limit further rotation of the ladder support member 24 about the axis 36.

In one embodiment, each tubular sleeve 30 includes a notch (not shown) at the end closest to the front and rear rails 14 and 16, respectively. A sturdy pin or bolt is mounted into the leg 34 with the pin or bolt freely traveling between upper and lower rotation limiters (not shown) of the notch (similar to the rotation limiters 66a and 66b of notch 58 but in horizontal disposition) to limit rotation of the ladder support members 24 about the axis of rotation 36 beyond the substantially horizontal and vertical positions shown in FIGS. 1 and 2, respectively. That is, the pin or bolt engages the lower rotation limiter of the notch when the ladder support member 24 is pivoted to the substantially horizontal position and likewise engages the upper rotation limiter when the ladder support member is pivoted to the substantially vertical position. In this way, the pin or bolt prevents the leg 34 from sliding out of the tubular sleeve 30 and also prevents ladder support members 24 from pivoting beyond the horizontal and vertical positions. In this embodiment, rotation limiters 70 and 72, and stop 38 can be dispensed with.

Referring to FIGS. 1, 2 and 8, each ladder support member 24 preferably includes a perpendicular, outwardly turned leg 74 connected to or integral with a remote end 76 of the ladder support member 24, and a second perpendicular, downwardly turned leg 78 extending from the outwardly turned leg 74. In this way, the perpendicular, outwardly turned legs 74 support the remote ends 76 of the ladder support members 24 on the front and rear rails 14 and 16, respectively, as the ladder support members are pivoted to the horizontal "use" position. Moreover, as a ladder carrying pick-up truck accelerates and decelerates, such as truck 80 in FIG. 1, the perpendicular, downwardly turned legs 78 "strike" the front and rear rails 14 and 16, respectively, to substantially eliminate rearward or forward movement of the ladder 26.

Figure 9:
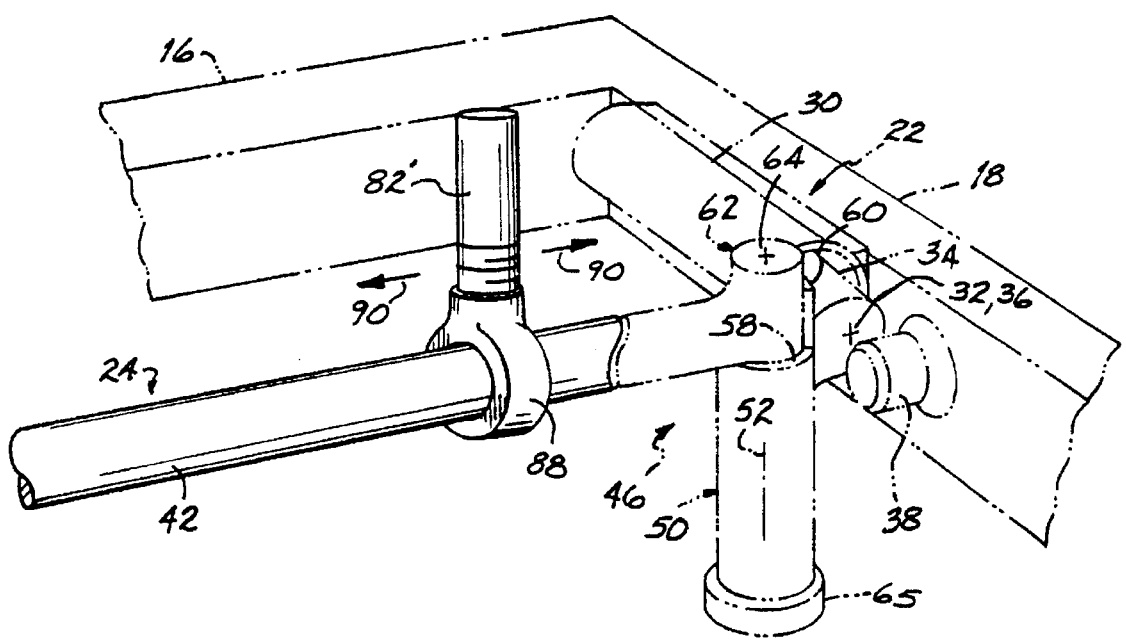
FIG. 9 is a view similar to FIG. 3 showing an adjustable ladder support element axially adjustable along the length of a ladder support member.

As shown in FIGS. 3–7, each ladder support member 24 preferably includes a ladder support element 82 mounted thereto adjacent the inner end 40 and perpendicular to the ladder support member. As shown most clearly in FIG. 6, the ladder support elements 82 (one shown) are provided for supporting a longitudinal edge 84 of the ladder 26 when the ladder support members are pivoted to the vertical position. In one embodiment as shown in FIG. 9, a ladder support element 82' (one shown) is adjustably mounted to each of the ladder support members 24 (one shown) for selective positioning adjacent the inner end 40. The adjustable ladder support element 82' as shown in FIG. 9, made of a ¾" round steel bar threadably engaged to a "D" shaped steel ring 88 for example, is necessary when a ladder rack includes a vertically extended side rail (not shown) disposed above the side rail 18. In this way, the ladder support elements 82' are axially positionable along the length of the ladder support members 24, as shown by the arrows 90 in FIG. 9, such that the ladder support elements "clear" the vertically extended side rail (not shown) when the ladder support members are pivoted to the vertical position.

To install the ladder support accessory 10 of the present invention, the tubular sleeves 30 are first welded or otherwise joined to a side rail 18 of the truck rack 12. Next, the legs 34, which are welded or otherwise joined to the second tubular sleeves 50, are inserted into the tubular sleeves 30, and the stops 38 are then welded or otherwise joined to the side rail 18. Lastly, the legs 62 of the ladder support members 24 are inserted into the second tubular sleeves 50 and the ladder engaging sections 42 are joined to the legs, with the perpendicular, outwardly turned legs 74 of the ladder support members being supported by the front and rear rails 14 and 16, respectively. In this way, the ladder support members 24 extend inboard of and substantially parallel to the front and rear rails 14 and 16, respectively, for securing the ladder 26 in accordance with the present invention.

Alternatively, the tubular sleeves 30 and 50, legs 34 and 62 and ladder engaging sections 42 are preassembled and joined to steel plates as describe above. In this way, the steel plates, and thus the ladder support members 24, are readily welded or otherwise joined to the side rails 18 directly, or through the "C-shaped" channel members previously described.

In use, the ladder 26 is secured to the ladder support members 24 through cords 28 or other well known means as shown in FIG. 1. In the horizontal "use" position shown in FIG. 1, the ladder 26 is supported at least partially on the front and rear rails 14 and 16, respectively. When access is required to the truck bed 20, the ladder support members 24 and, thus, the ladder 26 are pivoted to the substantially vertical position, as shown by arrow 44 in FIGS. 2 and 6, until the rotation limiter 70 engages the side rail 18 as shown in FIG. 6. In this position, the ladder 26 is supported along its longitudinal edge 84 by the ladder support elements 82 as shown most clearly in FIG. 6. Furthermore, the ladder support members 24 are self-supporting in the vertical position until the ladder support members 24 are pivoted to the horizontal position shown in FIG. 1. Thus, in accordance with the invention, convenient access to the truck bed 20, free of obstruction by the ladder 26, is provided by simply pivoting the ladder support members 24 to the vertical position without unsecuring the ladder. When the ladder support accessory 10 is not in use, the ladder support members 24 are folded along the side rail 18, as shown in FIGS. 7 and 8, and are releasably engaged by the hooks 68 mounted to the side rail.

It will be appreciated by those skilled in the art that variations of the present invention are possible without departing from the spirit of the present invention. It is contemplated that the construction of joints 22 could be accomplished with hinges, sealed bearings or a ball and socket design, for example. Furthermore, while the support members 22 have been described in a preferred embodiment as being made of ¾" round steel bar, it is understood that hollow metal tubing or other lighter materials are also possible. Moreover, it is understood that while the present invention is shown and described herein as pivotably supporting a ladder, the invention is by no means limited to ladders per se. Those skilled in the art will recognize that the present invention is also suitable for pivotably supporting other elongated items, such as PVC pipes and lumber, for example, without departing from the spirit or scope of the present invention.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicant's invention.

Having described the invention, what is claimed is:

1. An accessory for pivotally supporting a ladder on a truck rack having front and rear rails and at least one side rail extending therebetween and further being disposed above a truck bed, said accessory comprising:

at least one rotary joint, said joint including a stationary element fixedly mountable to a horizontally disposed truck rack side rail, and a movable element rotatably supported by said stationary element and movable relative thereto about a generally horizontal axis substantially parallel to the longitudinal axis of said truck rack side rail; and at least one ladder support member having an inner end connected to said movable element of said joint and pivotable therewith, said ladder support member having a ladder engaging section pivotable with said inner end in a substantially vertical plane disposed generally transverse to said truck rack side rail between a first position in which said ladder engaging section is in a generally horizontal position disposed transverse to and inboard of said truck rack side rail and a second position in which said ladder engaging section is in a generally vertical position, said ladder engaging section being engageable with said ladder such that said ladder is at least partially engageable and supported on said front and rear rails when said ladder support member is pivoted to said first horizontal transverse position inboard of said truck rack side rail, said ladder being supported by said ladder support member when said ladder support member is pivoted to said second vertical position thereby providing convenient access to said truck bed free of obstruction by said ladder.

2. The accessory of claim 1 wherein said ladder support member incorporates a pivotable joint located between said inner end and said ladder engaging section, said ladder engaging section being further pivotable about said pivotable joint in a substantially horizontal plane between a use position as defined by said first position and a stow position wherein said ladder support member extends inboard of and substantially parallel to said side rail.

3. The accessory of claim 2 further comprising at least one latching member mountable on said side rail and releasably engageable with said ladder support member in said stow position to releasably maintain said ladder support member in said stow position inboard of and generally parallel to said side rail.

4. The accessory of claim 1 or 2 wherein said ladder support member includes at least one ladder support element mounted thereto adjacent said inner end of said ladder support member and being disposed generally in said vertical plane to engage the longitudinal edge of a ladder located on said ladder engaging section when said ladder support member is pivoted to said second generally vertical position.

5. The accessory of claim 4 wherein said ladder support element is adjustably mounted to said ladder support member at selectively different positions along the length thereof adjacent said inner end of said ladder support member.

6. The accessory of claim 1 further comprising a first rotation limiter fixedly connected to said ladder support member and engageable with said side rail when said ladder support member is pivoted in said second position to limit movement of said ladder support member beyond a substantially vertical position.

7. The accessory of claim 6 further comprising a second rotation limiter fixedly connected to said moveable element and engageable with said side rail when said ladder support member is pivoted in said first position to limit movement of said ladder support member beyond a substantially horizontal position.

8. An assembly for pivotally supporting a ladder on a truck, comprising:

a truck rack having front and rear rails and a side rail extending therebetween, said truck rack rails being disposed generally horizontally and mountable to a truck above a truck bed thereof;

at least two rotary joints, each of said joints including a stationary element fixedly mountable to said side rail and a movable element rotatably supported by said stationary element and movable relative thereto about a generally horizontal axis substantially parallel to the longitudinal axis of said truck rack side rail, with one of said stationary elements being mounted to said side rail adjacent said front rail and the other of said stationary elements being mounted to said side rail adjacent said rear rail; and at least two ladder support members, each of said ladder support members having an inner end connected, respectively, to said movable element of one of said joints and pivotable therewith, each of said ladder support members having a ladder engaging section pivotable with said inner end in a substantially vertical plane disposed generally transverse to said truck rack side rail between a first position in which said ladder engaging section is in a generally horizontal position disposed transverse to and inboard of said truck rack side rail and a second position in which said ladder engaging section is in a generally vertical position, said ladder engaging sections being engageable with said ladder at different spaced locations of said ladder adjacent said front and rear rails such that said ladder is at least partially engageable and supported on said front and rear rails when said ladder support members are pivoted to said first horizontal transverse position inboard of said truck rack side rail, said ladder being supported by said ladder support members when said ladder support members are pivoted to said second vertical position thereby providing convenient access to said truck bed free of obstruction by said ladder.

9. The accessory of claim 8 wherein each of said ladder support members incorporates a pivotable joint located between said inner end and said ladder engaging section, said ladder engaging section being further pivotable about said pivotable joint in a substantially horizontal plane between a use position as define by said first position and a stow position wherein said ladder support members extend inboard of and substantially parallel to said side rail.

10. The accessory of claim 9 further comprising at least two latching members mountable on said side rail and releasably engageable with said ladder support members in said stow position to releasably maintain said ladder support members in said stow position inboard of and generally parallel to said side rail.

11. The accessory of claim 9 or 10 wherein each of said ladder support members includes at least one ladder support element mounted thereto adjacent said inner end of said ladder support member and being disposed generally in said vertical plane to engage the longitudinal edge of a ladder located on said ladder engaging sections when said ladder support members are pivoted to said second generally vertical position.

12. The accessory of claim 11 wherein said ladder support element is adjustably mounted to said ladder support member at selectively different positions along the length thereof adjacent said inner end of said ladder support member.

13. The accessory of claim 8 further comprising a first rotation limiter fixedly connected to said at least two ladder support members and engageable with said side rail when said ladder support members are pivoted in said second position to limit movement of said ladder support members beyond a substantially vertical position.

14. The accessory of claim 13 further comprising a second rotation limiter fixedly connected to said moveable elements and engageable with said side rail when said ladder support members are pivoted in said first position to limit movement of said ladder support members beyond a substantially horizontal position.

15. An assembly for pivotally supporting a ladder on a truck, comprising:

a truck rack having front and rear rails and at least one side rail extending therebetween, said truck rack rails being disposed generally horizontally and mountable to a truck above a truck bed thereof; and at least one ladder support member having an inner end rotatably connected to said side rail, said ladder support member having a ladder engaging section pivotable with said inner end in a substantially vertical plane disposed generally transverse to said truck rack side rail between a first position in which said ladder engaging section is in a generally horizontal position disposed transverse to and inboard of said truck rack side rail and a second position in which said ladder engaging section is in a generally vertical position said ladder engaging section being engageable with said ladder such that said ladder is at least partially engageable and supported on said front and rear rails when said ladder support member is pivoted to said first horizontal transverse position inboard of said truck rack side rail, said ladder being supported by said ladder support member when said ladder support member is pivoted to said second vertical position thereby providing convenient access to said truck bed free of obstruction by said ladder.

16. The accessory of claim 15 wherein said ladder support member incorporates a pivotable joint located between said inner end and said ladder engaging section, said ladder engaging section being further pivotable about said pivotable joint in a substantially horizontal plane between a use position as defined by said first position and a stow position wherein said ladder support member extends inboard of and substantially parallel to said side rail.

17. The accessory of claim 16 further comprising at least one latching member mountable on said side rail and releasably engageable with said ladder support member in said stow position to releasably maintain said ladder support member in said stow position inboard of and generally parallel to said side rail.

18. The accessory of claim 15 or 16 wherein said ladder support member includes at least one ladder support element mounted thereto adjacent said inner end of said ladder support member and being disposed generally in said vertical plane to engage the longitudinal edge of a ladder located on said ladder engaging section when said ladder support member is pivoted to said second generally vertical position.

19. The accessory of claim 18 wherein said ladder support element is adjustably mounted to said ladder support member at selectively different positions along the length thereof adjacent said inner end of said ladder support member.

20. The accessory of claim 15 further comprising a first rotation limiter fixedly connected to said ladder support member and engageable with said side rail when said ladder support member is pivoted in said second position to limit movement of said ladder support member beyond a substantially vertical position.

21. The accessory of claim 20 further comprising a second rotation limiter fixedly connected to said moveable element and engageable with said side rail when said ladder support member is pivoted in said first position to limit movement of said ladder support member beyond a substantially horizontal position.

22. An assembly for pivotally supporting a ladder or, a truck, comprising:

a truck rack having a plurality of rails, said rails being disposed generally horizontally and mountable to a truck above a truck bed thereof; and at least one ladder support member having an inner end rotatably connected to one of said rails and further having a ladder engaging section pivotable with said inner end in a substantially vertical plane disposed generally transverse to said one rail between a first position in which said ladder engaging section is in a generally horizontal position and a second position in which said ladder engaging section is in a generally vertical position, said ladder engaging section being engageable with said ladder such that said ladder is at least partially engageable and supported by a pair of said rails when said ladder support member is pivoted to said first horizontal position, said ladder being supported by said ladder support member when said ladder support member is pivoted to said second vertical position thereby providing convenient access to said truck bed free of obstruction by said ladder.

23. The accessory of claim 22 wherein said ladder support member includes at least one ladder support element mounted thereto adjacent said inner end of said ladder support member and being disposed generally in said vertical plane to engage the longitudinal edge of a ladder located on said ladder engaging section when said ladder support member is pivoted to said second generally vertical position.

24. The accessory of claim 23 wherein said ladder support element is adjustably mounted to said ladder support member at selectively different positions along the length thereof adjacent said inner end of said ladder support member.

* * * * *

UNITED STATES PATENT AND TRADEMARK OFFICE
CERTIFICATE OF CORRECTION

PATENT NO. : 5,651,484
DATED : July 29, 1997
INVENTOR(S) : Lowell S. Fugman

It is certified that error appears in the above-identified patent and that said Letters Patent is hereby corrected as shown below:

Col. 1, line 14, "am" should read --are--

Col. 5, line 16, after "as" insert -- shown in FIG. 7 and by the dashed lines in FIG. 8. In the "use" position, the --

Col. 5, line 51 "fails" should read --falls--

Col. 9, line 61, "define" should read --defined--

Col. 11, line 23, "or, a" should read -- on a --

Signed and Sealed this

Twenty-eighth Day of April, 1998

Attest:

BRUCE LEHMAN

Attesting Officer      Commissioner of Patents and Trademarks